R. A. BLUNCK.
STALK CUTTER.
APPLICATION FILED OCT. 31, 1911.
1,081,201.
Patented Dec. 9, 1913.
2 SHEETS—SHEET 2.
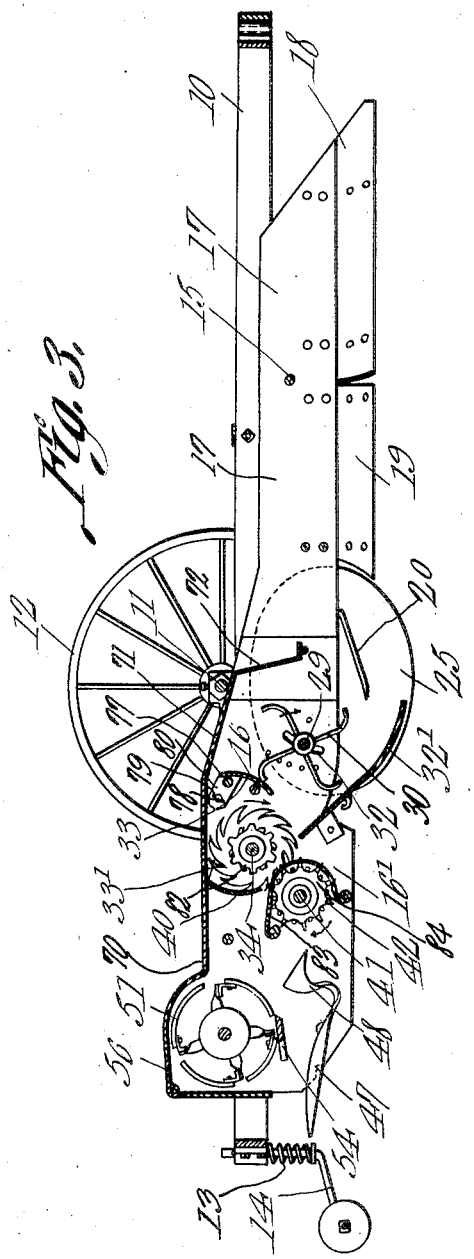
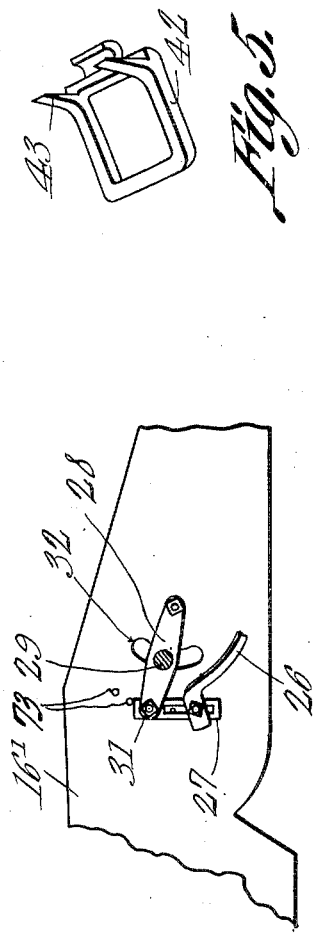
Witnesses
Robert A. Blunck,
Inventor
by C. A. Snow & Co.
Attorneys

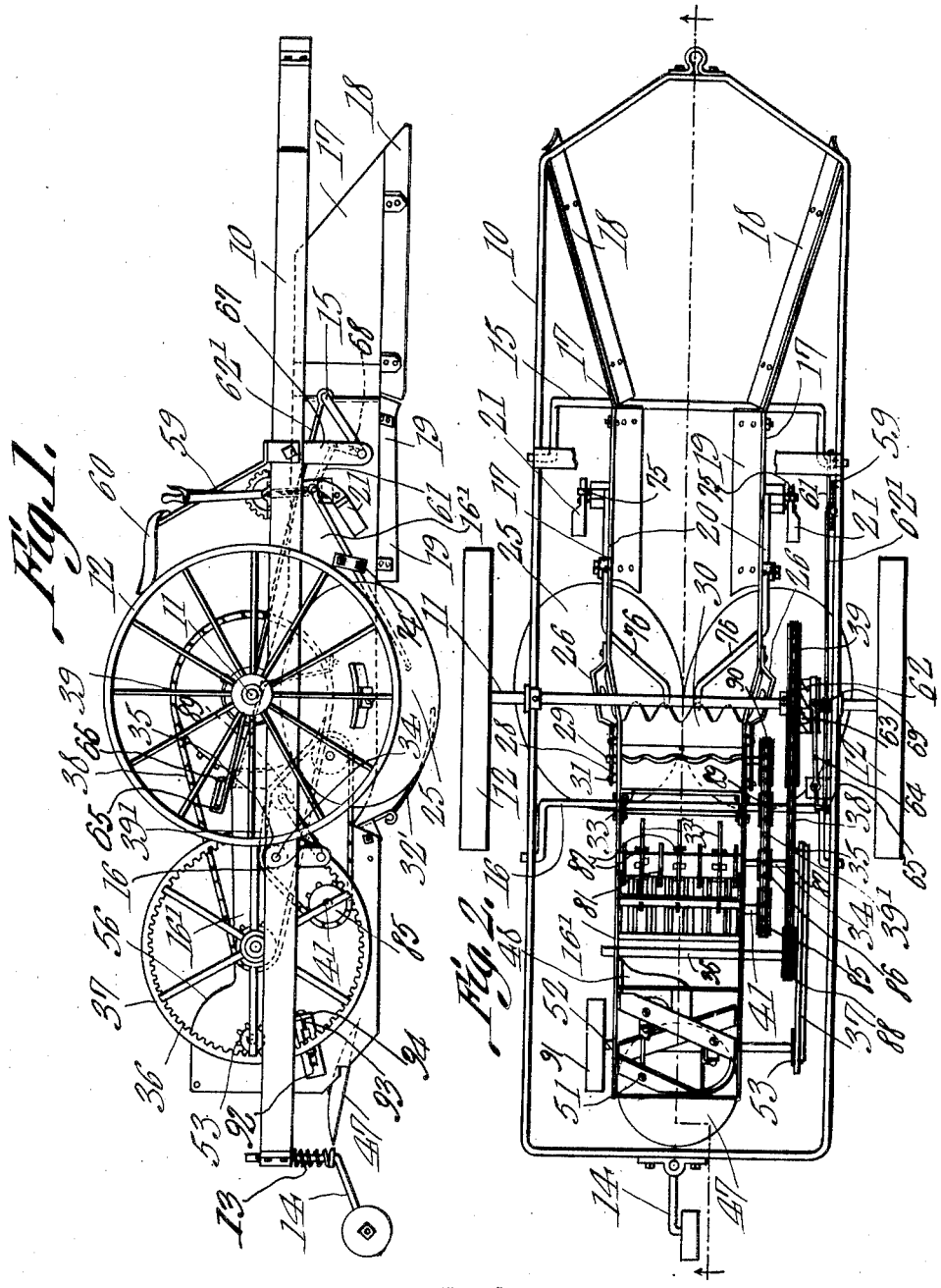

UNITED STATES PATENT OFFICE.

ROBERT A. BLUNCK, OF GRAND MOUND, IOWA.

STALK-CUTTER.

1,081,201.

Specification of Letters Patent.  Patented Dec. 9, 1913.

Application filed October 31, 1911. Serial No. 657,879.

*To all whom it may concern:*

Be it known that I, ROBERT A. BLUNCK, a citizen of the United States, residing at Grand Mound, in the county of Clinton and State of Iowa, have invented a new and useful Stalk-Cutter, of which the following is a specification.

This invention relates to stalk cutters, one of its objects being to provide a machine of this character which will gather the stalks, dig them from the ground, and then reduce the stalks and their roots to a finely comminuted state, the product thus obtained being deposited on the ground.

A further object is to provide means whereby the stalk and soil engaging elements can be raised and lowered relative to the main structure.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a top plan view thereof, certain of the parts being broken away. Fig. 3 is a longitudinal section. Fig. 4 is a detail view of the means employed for adjusting one of the disks and the wiper shaft. Fig. 5 is a perspective view of one of the links of the lower stalk engaging element.

Referring to the figures by characters of reference 10 designates a substantially rectangular main frame supported, at an intermediate point, by a drive axle 11 to which supporting wheels 12 are secured. The rear portion of the main frame 10 is yieldingly supported by a caster 14 the stem of which is provided with a cushioning spring 13. A large drive sprocket 39 is mounted loosely on the drive axle 11 and has a clutch member 63 upon one face thereof, this clutch member being adapted to be engaged by another clutch member 62 which is feathered on the axle 11. Said clutch member 62 can be shifted into or out of engagement with clutch member 63 by means of a lever 64. A finger 65 extends laterally from the free end of lever 64 and normally projects into a loop 66 formed at one end of a rod 62'. Said rod is pivotally mounted on an arched shaft 15 the ends of which are in alinement and are pivotally mounted within brackets 67 extending downwardly from the sides of the main frame 10. An arm 68 extends radially from one end portion of the arched shaft 15 and this arm is connected by a link 61 to a lever 59 fulcrumed on one side of the main frame 10 and having any suitable means whereby it can be locked against movement. By means of this lever 59 the arched shaft 15 can be rotated and when the intermediate portion of said shaft 15 is swung upwardly and rearwardly it will be seen that rod 62' will shift relative to lever 64 until one end wall of the loop 66 will strike finger 65 and thus cause lever 64 to swing laterally. This movement of lever 64 will be against the action of a spring 69 located on the axle 11, and will result in the withdrawal of clutch member 62 from engagement with clutch member 63. Thus as long as the arched shaft 15 is in raised position, the two clutch members 62 and 63 are disengaged from each other. When, however, the arched shaft 15 is swung downwardly to the position shown in Fig. 1, the pressure of rod 62' against the finger 65 is removed and spring 69 thus forces clutch member 62 into engagement with clutch member 63, thereby coupling sprocket 39 to the axle 11. Another arched shaft 16 similar in all respects to the shaft 15 is journaled in the sides of the main frame 10 at points back of the axle 11 and this shaft 16 lies in a plane constantly parallel with the plane in which the shaft 15 is located.

Arranged within the main frame 10 is a supplemental frame 16' through which the intermediate portions of the shafts 15 and 16 extend. Thus it will be seen that when the shafts 15 and 16 are swung upwardly and rearwardly this frame will be carried therewith and, when said shafts are swung downwardly and forwardly, the supplemental frame will also be carried therewith. The side members of the frame 16' are preferably formed of heavy sheet metal and merge into forwardly extending wings 17 the front ends of which diverge forwardly, as shown particularly in Fig. 2. Secured to these forwardly diverging portions of the wings 17 are scraping blades 18 preferably curved downwardly and inwardly and arranged along the lower edge portions of the wings 17 and back of the blades 18 are additional inwardly curved scraping blades 19. The side members of the frame 16' form the side walls of a housing 56 located back of the axle 11, the top 70 of this housing being extended downwardly and forwardly at its front end, as shown at 71 so that, when the arched shafts 15 and 16 are in their lowermost positions, as shown in Fig. 1, this inclined portion 71 will bear against the axle 11 and further downward and forward movement of the supplemental frame relative to the main frame 10, will thus be prevented. The top 70 of the housing 56 is extended downwardly at its front end between the sides of the frame 16', as shown at 72.

Links 28 are pivotally mounted to the sides of the supplemental frame 16' and constitute bearings for a transverse shaft 29 which extends through arcuate slots 32. The links 28 are pivotally connected, as at 31, to longitudinally slotted hangers 27 and the said pivotal connections 31, which are preferably in the form of bolts, can be extended through any one of an arcuate series of openings 73 formed in the sides of the supplemental frame 16' whereby the links 28 are held against swinging movement and the hangers 27 are supported at desired elevations. These slotted hangers 27 are adjustably engaged by the rear end portions of pivoted brackets 26. Each bracket has a concavo-convex disk 25 journaled thereon and the two disks converge downwardly so that, when the machine is in use, these disks will dig into the ground and remove the roots of the stalks to be cut.

For the purpose of directing the stalks accurately to the path between the disks 25, rods 20 are mounted for rotation upon the outer sides of the wings 17, these rods being preferably journaled within blocks 74 upon the said wings. Each rod has a finger 75 extending laterally from its upper end while a rearwardly and inwardly extending arm 76 is extended from the other end of the rod and overhangs one of the disks 25. Obviously the two arms 76 converge inwardly, as shown in Fig. 1. Each finger 75 is normally pressed upwardly by one arm of a weighted lever 21. Thus it will be seen that the rods 20 are normally rotated so as to press the arms 76 downwardly toward the disks 25. When, however, said arms 76 are shifted upwardly by any obstruction passing thereunder, the rods 20 are rotated so as to cause the fingers 75 to swing downwardly, thereby actuating the levers 21 and causing the weighted ends thereof to move upwardly. As soon as the obstruction is passed, these weighted levers will return the rods and their arms 76 to their initial positions.

The shaft 29 hereinbefore referred to carries a plurality of radially extending wiping blades 30 each blade having its outer edge portion curved backwardly and waved or corrugated, the transverse curvature of each blade being indicated in Fig. 3 while the waved edge of the blade has been shown in Fig. 2. These wiping blades move between the disks 25 and travel downwardly close to an apron 32' which is extended between the lower end portions of the disks 25 and upwardly and rearwardly past the path of the wiping blades and under a guard or deflector 33 which is pivotally mounted, upon a transverse rod 77 and is adapted to be secured in adjusted position by means of a binding screw 78 or the like extending through a slot 79 in an arm 80 extending from the guard 33.

A transverse shaft 34 is journaled in the sides of the supplemental frame 16' back of shaft 16 and directly back of the throat formed by the apron 32' and the shield or deflector 33. This shaft 34 has a series of spaced toothed cutting disks 33' secured to it, the teeth of the disks, as shown in Fig. 3, being curved in the direction of rotation. Furthermore a toothed chopping disk 81 is located between every two disks 33' and extending laterally from each disk 33' are fingers 82. An arcuate guard plate 40 is arranged back of the upper portions of the disks 33' and extending under this guard plate but spaced therefrom is another curved plate or grating 83 extending partly around a transverse shaft 41 journaled in the sides of the supplemental frame 16'. Secured to this shaft 41 is a series of sprockets 84 and extending around each sprocket is an endless chain made up of links 42 having outwardly extending prongs or teeth 43 adapted to travel within the slots in the plate or grating 83. Shaft 41 has a sprocket 85 which receives motion through a chain 39' from a sprocket 86 secured to the shaft 34. Said shaft 34 is also provided with a gear 87 which extends into and meshes with a large gear 37 secured to one end of a transverse shaft 36 journaled in the sides of the supplemental frame 16'. A sprocket 88 is secured to the shaft 36 and receives motion, through a chain 38, from the large sprocket 39 hereinbefore referred to. A chain 39' is extended over an idler sprocket 89 and also into engagement with a sprocket 90 secured to the shaft 29. Gear 37 engages a smaller gear 53 secured to a transverse shaft 52 which, if desired, may be provided with a fly wheel 91. Secured to this shaft 52 are obliquely disposed shearing blades 51, these blades coöperating with a fixed knife 54 extending transversely within the casing 56. Directly under the fixed blade 54 is a convex distributing disk 47 supported from one side of the frame 16' by means of a bracket 48.

It will be apparent that when the parts are in active position, as shown in the drawings, the machine when drawn forward, will gather the stalks inwardly toward the center of the machine so that, as the machine continues to move forwardly, the disks 25 will cut into the soil and disengage the roots of the stalks from the soil. Arms 76 will direct the stalks onto the apron 32' where they will be engaged by the wiping blades 30 and thrown upwardly and rearwardly along the apron and into the paths of the cutting disks 33'. As shown in Fig. 2 the sprocket 85 is much larger than the sprocket 86 and, therefore, the shaft 41 will be rotated at a lower speed than the shaft 34. The teeth 43 connected to the links 42 on sprockets 84 will travel in the direction indicated by the arrow in Fig. 3 and thus tend to retard the movement of the stalks rearwardly over the grating or plate 83. The stalks, however, will be engaged by the curved teeth on the disks 33' and pulled rearwardly thereby in spite of the retarding action of the teeth 43 and any dirt which may be adhering to the roots as they pass over the grating 83 will be cut off or loosened by the disks 81 and by the laterally extending fingers 82. The teeth on the disks 33' will cut the stalks longitudinally and any particles which may be torn from the stalks by the teeth 33 while moving forwardly and downwardly will be dropped onto the ground through the space between the apron 32' and the grating 83. The split stalks will be forced rearwardly by the disks 33' and by the smaller disks 81 and the fingers 82 and will be brought, ultimately, into position where they will be sheared by the blades 51 coöperating with the blade 54. The stalks will thus be reduced to a finely comminuted state and the particles will drop onto the spreading disk 47 and be dropped on the ground.

When it is desired to lift the stalk and ground engaging elements out of active positions, the ends of the chain 38 are uncoupled after which lever 59 is shifted so as to pull through link 61 upon arm 68. Thus shaft 15 and, consequently, shaft 16 will be rotated so that the intermediate portions will swing upwardly and rearwardly. The supplemental frame 16' will be given a corresponding movement, and as it thus moves upwardly and rearwardly, the clutch member 62 will be shifted as hereinbefore described so as to uncouple sprocket 39 from axle 11. Thus the operation of the mechanism will not only be stopped but the disks 25 will be lifted above the surface of the ground.

As shown in Fig. 1 the blade 54 can be adjustably mounted by extending its ends through slots 92 and connecting said ends, by adjusting screws 93, to brackets 94. Instead of providing a chain 38 which can be separated for the purpose of permitting the supplemental frame to be swung upwardly and rearwardly, said chain 38 can be sufficiently long to permit the relative movement of the two frames, a suitable tightener being provided for holding the chain normally taut but permitting upward and rearward movement of the supplemental frame relative to the main frame.

What is claimed is:—

1. In a stalk cutter, the combination with a main frame, of a supplemental frame, means for swinging the supplemental frame upwardly and rearwardly relative to the main frame, downwardly converging digging disks carried by the supplemental frame, and a revoluble wiper supported by the supplemental frame above the disks.

2. In a stalk cutter, the combination with a main frame, of a supplemental frame, means for swinging the supplemental frame upwardly and rearwardly relative to the main frame, downwardly converging digging disks carried by the supplemental frame, and a revoluble wiper supported by the supplemental frame and above the disks, said wiper and disks being adjustable together relative to the supplemental frame.

3. In a stalk cutter, the combination with a main frame, of a supplemental frame, means for swinging the supplemental frame upwardly and rearwardly relative to the main frame, downwardly converging digging disks carried by the supplemental frame, and a revoluble wiper supported by the supplemental frame and above the disks, said wiper and disks being adjustable together relative to the supplemental frame, said disks being also adjustable relative to the wiper.

4. In a stalk cutter, the combination with a main frame, of a supplemental frame, gathering scrapers converging rearwardly and carried by the supplemental frame, rearwardly converging deflecting arms back of the scrapers and yieldable upwardly, and digging disks converging downwardly under said arms and carried by the supplemental frame, and means for shifting said supplemental frame upwardly and rearwardly relative to the main frame to disengage the disks from the soil.

5. In a stalk cutter, the combination with a main frame, of a supplemental frame, gathering scrapers converging rearwardly and carried by the supplemental frame, rearwardly converging deflecting arms back of the scrapers and yieldable upwardly, digging disks converging downwardly under said arms and carried by the supplemental frame, an apron extending between and over the disks, a revoluble wiper supported above the apron for directing cut stalks rearwardly along the apron, and cutting mechanism for receiving the stalks from the apron.

6. In a stalk cutter, the combination with a main frame, of a supplemental frame, gathering scrapers converging rearwardly and carried by the supplemental frame, rearwardly converging deflecting arms back of the scrapers and yieldable upwardly, digging disks converging downwardly under said arms and carried by the supplemental frame, an apron extending between and over the disks, a revoluble wiper supported above the apron for directing cut stalks rearwardly along the apron, cutting mechanism for receiving the stalks from the apron, and means for swinging the supplemental frame upwardly and rearwardly to render the cutting mechanism and the wiper inactive and to disengage the disks from the soil.

7. In a stalk cutter, the combination with a main frame and a supplemental frame, of downwardly converging digging disks carried by the supplemental frame, spaced toothed disks for splitting stalks longitudinally, means interposed between the disks and revoluble therewith for engaging stalks to subject the longitudinal sections thereof to pressure and to remove dirt therefrom, revoluble means under the disks for retarding the movement of the stalks under the action of the disks, and a wiper mounted for rotation above the digging disks for directing stalks against the cutting disks.

8. In a stalk cutter, the combination with a main frame and a supplemental frame, of downwardly converging digging disks carried by the supplemental frame, spaced toothed disks for splitting stalks longitudinally, means interposed between the toothed disks and revoluble therewith for engaging stalks to subject the longitudinal sections thereof to pressure and to remove dirt therefrom, revoluble means under the disks for retarding the movement of the stalks under the action of the toothed disks, a wiper mounted for rotation above the digging disks for directing stalks against the cutting disks, and coöperating fixed and revoluble blades for reducing the longitudinally cut stalks to a finely comminuted state.

In testimony that I claim the foregoing as my own, I have hereto affixed my signature in the presence of two witnesses.

ROBERT A. BLUNCK.

Witnesses:
HENRY E. VETTER,
GEORGE F. COOK.